United States Patent
Webster (10) Patent No.: US 6,756,429 B2
(45) Date of Patent: Jun. 29, 2004

(54) METHOD FOR IMPROVING FIBER DISPERSION AND ORIENTATION IN LET-DOWNS OF LONG FIBER REINFORCED COMPOSITES

(75) Inventor: Joseph R. Webster, Charlotte, NC (US)

(73) Assignee: Clariant Finance (BVI) Limited, Tortola (VG)

( * ) Notice: Subject to any disclaimer, the term of this patent is extended or adjusted under 35 U.S.C. 154(b) by 557 days.

(21) Appl. No.: 09/754,931

(22) Filed: Jan. 4, 2001

(65) Prior Publication Data

US 2004/0044105 A1 Mar. 4, 2004

(51) Int. Cl.⁷ .............................................. C08K 5/34
(52) U.S. Cl. ...................................... 524/99; 523/348
(58) Field of Search ............................ 524/99; 523/348

(56) References Cited

U.S. PATENT DOCUMENTS

| | | |
|---|---|---|
| 3,287,324 A | 11/1966 | Sweeny |
| 3,591,409 A | 7/1971 | Aubrey et al. |
| 3,671,542 A | 6/1972 | Kwolek |
| 3,993,726 A | 11/1976 | Moyer |
| 4,541,884 A | 9/1985 | Cogswell et al. |
| 4,549,920 A | 10/1985 | Cogswell et al. |
| 4,559,262 A | 12/1985 | Cogswell et al. |
| 4,783,349 A | 11/1988 | Cogswell et al. |
| 4,892,600 A | 1/1990 | Beever |
| 4,937,208 A | 6/1990 | Yamamoto |
| 5,019,450 A | 5/1991 | Cogswell et al. |
| 5,051,459 A | 9/1991 | Slongo et al. |
| 5,157,067 A | 10/1992 | Burditt et al. |
| 5,213,889 A | 5/1993 | Cogswell et al. |
| 5,213,889 A | 10/1996 | Cogswell et al. |
| 5,618,909 A | 4/1997 | Lofquist et al. |
| 5,670,561 A | 9/1997 | Scheibelhoffer et al. |
| 5,851,238 A | 12/1998 | Gadoury et al. |
| 6,123,761 A | 9/2000 | Healy |

FOREIGN PATENT DOCUMENTS

| | | |
|---|---|---|
| AU | 685271 | 10/1995 |
| WO | WO 95/28443 | 10/1995 |

OTHER PUBLICATIONS

Colorants, Encyclopedia of Polymer Science and Technology, vol. 3, p. 746–758, 1985.
K.J. Burnam, Nanocomposites containing Nanoclusters of Ag, Cu, Pt, Os, Co3c, Fe2P, Ge, or Pt/Sn, Nanostructured Materials, vol. 5, No. 2, p. 155–169, 1995.
L.M. Gan, Preparation of Conducting Polyaniline–Coated Barium and Sulfate Nanoparticles in Inverse Microemulsions, Materials Chemistry and Physics 40, p. 94–98, 1995.
Y. Dirix, Optical Properties of Oriented Polymer/Dye Polarizers, Macromolecules, vol. 28, p. 486–491, 1995.

Primary Examiner—Edward J. Cain
(74) Attorney, Agent, or Firm—Anthony A. Bisulca (57) ABSTRACT

The invention provides a process for making a let-down of glass fiber reinforced composite comprising a polymer matrix and from 5 wt. % to about 60 wt. % of reinforcing fibers long fibers. The fibers are incorporated in the let-down as a concentrate of pultruded composite of substantially parallel fibers and thermoplastic polyamide where fiber length equals pellet length. The fibers in the let-down have improved dispersion and orientation in the final thermoplastic polymer matrix thereby providing substantially improved physical properties from the forming of the fiber reinforced pellet with a modified pellet polymer matrix. The long fibers are incorporated as a concentrate pellet in the final matrix polymer by mixing pellets with the final polymer compound in a heated extrusion mixing zone used to convey a composite melt into a shaping zone, whereby the mixing under heat and rotational shear disperses the long fiber-reinforced pellets into the let-down matrix polymer.

3 Claims, 3 Drawing Sheets

*30% Glass Filled Nylon 6 containing 1.0% PR178

METHOD FOR IMPROVING FIBER DISPERSION AND ORIENTATION IN LET-DOWNS OF LONG FIBER REINFORCED COMPOSITES

FIELD OF THE INVENTION

The invention relates to thermoplastic fiber reinforced composites utilized in molding and extrusion, and in particular, composites having as a matrix resin polyamide polymers.

BACKGROUND OF THE INVENTION

There has been growing interest in the use of long fiber reinforced thermoplastic composites as materials of construction because of the excellent physical properties inherent in a reinforcing network of fibrous materials such as glass, carbon, boron and alumina fibers embedded in a thermoplastic, as opposed to a thermosetting polymer matrix. Improvements in thermoplastic pultrusion techniques have occurred since the early 80's for directly impregnating thermoplastic high polymers with a high degree of wet-but of continuous fiber rovings so that chopped pellets of 10 mm and longer can be used in let downs with thermoplastic resin compounds. Chopped pellets of good quality now can readily incorporated in molding compounds which are fed directly into extruders feeding injection molds or extrusion dies.

Long fiber reinforced composites of high temperature engineering resins, e.g., polyarylethers, especially polyetherketones and polyethersulphones are also known. For example, carbon fiber reinforced polycarbonate, and polyetheretherketone composite materials have found increasing commercial application. Polypropylene and nylon have generated the highest commercial volumes to date among the thermoplastics, especially directed to automotive end-uses.

Resin structures reinforced with long (>5 mm) fibers have superior processing properties and often better physical properties at the same degree of fiber loading, as compared to those reinforced with short (2 mm) fibers. The long fiber compounds are generally manufactured by a so-called pultrusion method in which a continuous reinforcing fiber bundle is impregnated with a thermoplastic resin while pulling fiber roving bundles through a cross-head extruder and then through a die (U.S. Pat. No. 3,993,726), or a continuous reinforcing fiber bundle is immersed in a thermoplastic resin melt to wet it while it is drawn and then pulled through a die.

The following patents relate to the formation of long fiber reinforced pultrusion composites: U.S. Pat. Nos. 4,541,884, 4,549,920, 4,559,262, 4,892,600, 5,019,450, 5,213,889.

U.S. Pat. No. 3,993,726 describes a process for the continuous production of articles of thermoplastic resin reinforced with long fibers of glass. According to the method described, the roving is impregnated with a mixture of wetting thermoplastic resin and reinforcing thermoplastic resin in a crosshead die fed by an extruder. The fibers are impregnated by first expanding the fibers of the roving and coating the expanded fibers in a crosshead die and passing the fibers and the thermoplastic mixture through a bar zone so that the material thoroughly penetrates into each fiber. This system is not completely satisfactory, since the wetting polymer dilutes in the other polymer and physical properties are lost.

U.S. Pat. No. 4,937,208 discloses a process for producing thermoplastic resins reinforced with long fibers in which rovings are impregnated with a wetting thermoplastic polymer by means of a die and a baffle zone, then taking up the impregnated rovings in a second die where they are then covered with a thermoplastic polymer. As explained, the wetting thermoplastic polymer must be compatible with the coating thermoplastic polymer. Suggested combinations disclosed were grafted high-density polyethylene—low-density polyethylene, grafted high-density polyethylene—ethylene-vinyl acetate (EVA) copolymer, grafted EVA—polyvinyl chloride, grafted polypropylene—polypropylene, sequenced poly(ether-amide) copolymer—polyamide functonalized polyamide (for example $\alpha,\Omega$-diamines, $\alpha,\Omega$-diacids, $\alpha$-amine-$\Omega$-acid, monoamine)—polyamide, modified EVA—EVA or low-density polyethylene (PEbd).

U.S. Pat. No. 4,783,349 discloses a method of producing a fiber reinforced structure by melt impregnation of continuous fibers with a thermoformable polymer melt comprising pre-wetting the filaments of the fibers with a composition containing a melt plasticizer for the thermoformable polymer, prior to introducing the pre-wetted fibers into the melt, optionally removing the plasticizer when the composition contains a polymer miscible with plasticizer to leave polymer coated filaments and introducing the pre-wetted filaments into a polymer melt, optionally a polymer melt containing a metal plasticizer for the melt and preferably removing the plasticizer from the composition by volatilization. The pre-wetted polymer coated filaments can be let down into a compounding extruder running with the primary thermoplastic or processed directly in an injection molding apparatus being fed with a blend of fiber-reinforced, and non fiber-reinforced compound for use in processes other than direct melt impregnation. They can be used in the process known as film stacking impregnation or in processes involving initial impregnation using particulate polymers or alternatively in conventional extrusion compounding.

Nylon polymers have also been stabilized by incorporating stabilizing materials directly into the polymer chain. For example, epsilon-caprolactam may be polymerized in the presence of water, carboxylic acids and hindered piperidine derivatives (polyalkylpiperidines) to form a modified nylon 6 polymer that is stabilized against heat and light degradation. Such a stabilized polymer is described in PCT Application WO 95/28443 published Oct. 26, 1995.

Difficulties in the pultrusion of engineering resins, e.g. polyamide, result from the poor wet-out of the fibers. This problem is not so severe in the case of polypropylene. Some approaches to improving the pultrusion of polypropylene have been disclosed whereby the reinforcing fiber roving is treated in a separate step with a wetting thermoplastic polymer or solution thereof, such as a with a polyolefin modified by grafting with an ethylenically unsaturated polycarboxylic acid. However, this method requires a selection of specialized wetting polymers which must be substantially compatible with the matrix polymer, as well as a limit in the highest flexural or tensile modulus, generally, not to mention the cost and environmental impact of such a method. Recently, higher melt-flow polypropylene products have become the standard material for the one-pass pultrusion at high (30 vol. %) fiber loadings.

For a variety of reasons, such as the need to reduce costs and to fabricate lighter structures, improved flexural and tensile modulus are desired from less costly polymer composites. The limitations of flowability for fiber-reinforced composites present problems particularly in the injection molding of large surface area articles using a composite wherein the fiber content exceeds 15, 20 and even greater than 30 volume percent. Desirable thermoplastic materials, such as polyamides, in particular the phthalamide-types which otherwise provide inherently high modulus, and physical properties at high in-service temperatures have limits on moldability, especially in light of the molding tonnage available to molders. The high volume content of fibers results in relatively little polymer being available at the surfaces of the work pieces to be joined. Differences in the dispersion patterns of the long fibers results in variations in resulting physical properties of the molded composite.

In the manufacture of long fiber reinforced pellets of conventional engineering resins having acceptable end-use physical properties have melt viscosities in excess of 100 $Ns/m^2$. Adequate wetting of the fibers in a pultrusion process with a melt of such high viscosity is not easily achieved. Problems of fiber roving breakage, lowering of line speeds to promote wet-out, and polymer degradation are possible. Any attempts to improve production by reducing the pultrusion matrix polymer melt viscosity, such as by increasing the melt temperature runs a greater risk of operating in an unstable thermal window. Other methods to reduce melt viscosity of the pultrusion matrix polymer by blending the matrix polymer with higher melt-flow materials is accompanied by undesired loss in physical properties, greater complexity and/or cost.

For molding or extrusion of shaped articles from long-fiber reinforced composites in which a fiber-reinforced concentrate is let down with additional matrix resin compound, there is a second added work history experienced by the fiber reinforced concentrate. This results inevitably in fiber breakage (attrition) and an inherent loss in flexural and tensile moduli, and/or impact strength. Improvements in the resulting physical properties of the final composite are sought.

It would be desirable to improve the physical properties of long fiber reinforced thermoplastic composites made by the method of letting down long fiber concentrates wihout resorting to harsh conditions, or blending with polymeric flow improvers therefore.

SUMMARY OF THE INVENTION

The invention provides a process for making a letdown of glass fiber reinforced composite comprising a polymer matrix and from 5 wt. % to about 60 wt. % of reinforcing fibers long fibers. The fibers are incorporated in the let-down as a concentrate of pultruded composite of substantially parallel fibers and thermoplastic polyamide where fiber length equals pellet length. The fibers in the let-down have improved dispersion and surprisingly greater, as opposed to less orientation in the final thermoplastic polymer matrix relative to prior art long fiber composite, thereby providing substantially improved physical properties from the forming of the fiber reinforced pellet with a modified pellet polymer matrix. The long fibers are incorporated as a concentrate pellet in the final matrix polymer by mixing pellets with the final polymer compound in a heated extrusion mixing zone used to convey a composite melt into a shaping zone, whereby the mixing under heat and rotational shear disperses the long fiber-reinforced pellets into the let-down matrix polymer.

The long fiber reinforced pellets comprise a modified pellet polymer matrix according to (a) or (b),
   (a) the pellet matrix polymer is modified in the polymer polymerizing process by introducing an effective amount of a compound according to (A)–(I) or where applicable, a hydrolyzate thereof, with precursors of the matrix polymer, and method
   (B) whereby the long fiber pellet is formed with a pellet matrix polymer that contains an effective amount of compounds selected from (B)—(XX) in intimate contact with the continuous fiber during the formation of the long fiber pellets.

DETAILED DESCRIPTION OF THE PREFERRED EMBODIMENTS

By the term "long fibers" is meant any fibrous product in which the fibers are sufficiently long to give a roving or tow used under the pultrusion processing conditions to be drawn through a molten thermoplastic polyamide matrix polymer. Suitable long fiber materials used in the present invention include e-glass fiber, carbon fiber, pitch-based carbon fiber, stainless steel fiber, and synthetic polymer fibers, e.g. KEVLAR, including mixtures of glass fiber with carbon fiber, glass fiber with polymer fiber, and carbon fiber with polymer fiber, and any other useful mixture of fibers.

The continuous glass fiber rovings are available commercially from major producers, e.g. PPG Industries, Manville Corp, and Owens Corning, Inc. Stainless steel fibers are available from Bekaert Fibre Technologies. The rovings are available is creels or spools and have sufficient integrity to be pulled through the molten polymer. Depending on the apparatus, a number of such rovings may be processed in the same impregnation zone. In the case of commercially available glass rovings each roving may consist of up to 8,000 or more continuous glass filaments. Carbon fiber tapes containing up to 12,000 or more carbon fibers may be used. The continuous fibers may be provided with any of the conventional surface sizes, particularly those designed to maximize adhesion with the matrix polymer.

The thermoplastic pellet matrix polymer modified to be employed in the composites according to the invention are polyamides, especially the high temperature polyamides such as available under the Zytel® mark of Dupont de Nemours, Wilmington, Del. The polyamides can be optionally combined with thermoplastics known to be combinable with polyamide, and may include polyetheramides, polyurethanes, polyphthalamides, polysulphones, polycarbonate, polyoxymethylenes, polyarylene sulphides, polyphenylene oxide/polystyrene blends, polyetheretherketones and polyetherketones.

The temn polyamide as used herein denotes homopolymers, copolymers, blends and grafts of synthetic long chain polyamides having recurring amide groups as an integral part of the main polymer chain. Exemplary of widely used polyamides are nylon 6 (polycaprolactam); nylon 6,6 (polyhexamethylene adipamide); lesser used nylons include nylon 4,6 (poly(tetramethylenediamine-co-adipic acid)); nylon 6,10 (polyhexamethylene sebacamide); nylon 7 (polyenantholactam); nylon 11 (polyaminoundecanamide); nylon 12 (polydodecanolactam), etc. These long chain polyamides are generically referred to as nylons. The term polyamide also denotes the aramids (aromatic polyamides), such as poly (metaphenylene isophthalamide (See U.S. Pat. No. 3,287, 324), and poly(p-phenylene terephthalamide) (KEVLAR®). (See U.S. Pat. No. 3,671,542). The invention can be practiced with polyamides regardless of the polymer morphology. Amorphous, semi-crystalline or highly crystalline polyamides as well as blends of different crystallinity are benefited. Commercially available polyamide resins are known from sources such as BASF, DSM, Evansville, Ind., E I duPont de Nemours, Wilmington, Del.; formulated polyamides are available from Ferro Corp., Cleveland, Ohio, Hanna Engineered Materials, Bethlehem, Pa., Huls America, Somerset, N.J., and A. Schulman, Akron, Ohio; reinforced polyamides are available from DSM RIM Nylon, Westlake, Ohio.

There are two principal types of nylon polymerization processes, both involving the creation of new amide groups. In nylon polymerizations from dicarboxylic acids and diamines, the carboxyl and the amine end groups of the monomers or the oligomers condense to form water which is removed under vacuum. In polymerization of nylons from lactams, an addition reaction can also take place between an amine end group and the amide link of the lactam monomer to form a longer linear chain. The final stage of this type of polymerization also involves a condensation reaction between carboxyl end groups and amine end groups to form amide bonds and water which is eliminated.

Polyamides of commercial importance have well characterized optimal molecular weight and distribution, made possible by chain regulators and conditions. Chain regulators are compounds which react with the carboxyl end groups or amine end groups to form unreactive ends, such as hydrocarbon radicals (e.g., methyl, cyclohexyl, phenyl), or alternatively are compounds that react with the end groups to form either all carboxyl end groups or all amine end groups. These controlling agents are conventionally referred to as terminators because they tend to terminate the polymerization.

The polyamide precursor is preferably selected from the group consisting of lactams, monomers and oligomers of a $C_2$ to $C_{18}$ amino acid; monomers and oligomers of a $C_2$ to $C_{18}$ alkyl diamine with a $C_2$ to $C_{18}$ aliphatic.diacid; monomers and oligomers of a $C_2$ to $C_{18}$ alkyl diamine with a $C_8$ to $C_{24}$ aryl diacid or aryl diacid derivative; monomers and oligomers of a $C_6$ to $C_{24}$ aryl diamine with a $C_8$ to $C_{24}$ aryl diacid or aryl diacid derivative; monomers and oligomers of a $C_6$ to $C_{24}$ aryl diamine with a $C_2$ to $C_{18}$ alkyl diacid or alkyl diacid derivative; monomers and oligomers of a $C_8$ to $C_{14}$ aralkyl diamine with a $C_{10}$ to $C_{14}$ aralkyl diacid or diacid derivative; and copolymers thereof. Exemplary $C_2$ to $C_{18}$ amino acids are aminocaproic acid, polyaminocaproic acid, and 11-aminoundecanoic acid. Exemplary $C_2$ to $C_{18}$ alkyl diamines are butane diamine, hexamethylene diamine and dodecanediamine. Exemplary $C_2$ to $C_{18}$ aliphatic diacids are adipic acid, sebacic acid, and decanedicarboxylic acid. Exemplary $C_8$ to $C_{24}$ aryl diacids or aryl diacid derivatives are terephthalic and isophthalic acids. Exemplary $C_6$ to $C_{24}$ aryl diamines are para-phenylenediamine and meta-phenylene diamine. Exemplary $C_8$ to $C_{14}$ aralkyl diamines are meta-xylylenediamine and para-xylylenediamine. Exemplary $C_{10}$ to $C_{14}$ aralkyl diacids or diacid derivatives are phenylenediacetic acid isomers.

The most preferred linear polyamide pultrusion matrix polymers are nylon 6, and Nylon 6-6. As with Nylon 6 the polyamide precursors are caprolactam and aminocaproic acid with carboxyl and amine end groups. For the aramid polymers, the polyamide precursor preferably is either (1) an aryl diamine with an acid halide, and the end groups are selected from the group consisting of carboxylic acid derivatives, amines, and combinations thereof, or (2) an aryl diamine salt with an acid halide, and the end groups are selected from the group consisting of amine salts, amines, carboxylic acid derivatives, and combinations thereof. The preferred acid halides are terephthaloyl chloride and isophthaloyl chloride.

Typical reaction temperatures for nylon polymerizations are in a range of from about 180° C. to about 290° C., more preferably in a range of from about 225° C. to about 280° C. For the aramids, reaction temperatures are in a range of from about 15° C. to about 80° C., more preferably from about −15° C. to about 30° C. Further details for making modified polyamide resin according to method A are disclosed in U.S. Pat. No. 5,851,238, which is hereby incorporated by reference.

The modifier compounds incorporated into polyamide either during polymerization or during compounding prior to or during pultrusion are represented by the formulae (A) and (B) shown below (A)

in which A' in (A) comprises a functional group which is an amine, or A' contains a hydrolyzable group, e.g. amide, which forms an amine, or A' is an amide-forming group; R* is methyl or other lower ($C_2$–$C_4$ alkyl); and R" is selected from the group consisting of hydrogen; alkyl of 1 to 3 carbons; and —$OR_4$ in which $R_4$ is selected from the group consisting of hydrogen, methyl, and

(B)

n = 2, 3 or 4 alkyl containing 1 to 7 carbons; including dimers and trimers, in which at least one of $R_{40}$ is —OH, —OR, and at least one of $R_{40}$ is $R_a$, $R_b$, or $R_c$.

($R_a$)

($R_b$)

(Rc)

wherein R* is defined above, and R' has the same meaning as A' above.

Examples of (B) are compounds represented by (C)–(G):

(C)

(D)

(E)

(F)

(G)

Also suitable for incorporation in method (A) and (B) are the following:

(H)

(I)

In (B)–(I) $R_4$ can also be either formula (a') or (a")

(a')

(a")

where R' in a' and a" is hydrogen, $C_{1-6}$alkyl, e.g., —$CH_3$, —$CH_2CH_3$, $C_{1-4}$alkoxy, e.g., —$OCH_3$, —$OCH_2CH_3$ or —CO—$C_{1-4}$alkyl, e.g., —O—CO—$CH_3$, —O—CO—$CH_2CH_3$.

An exemplary method to make (D) above is as follows. Production of 1,3-di-(2',2',6',6'-tetramethylpiperidyl-4')-isophthalic acid amide 42.0 g of isophthalic acid are heated for 5 hours at 80° C. with 144.0 ml of thionyl chloride in the presence of catalytic quantities (3 ml) of dimethylformamide and then the excess thionyl chloride is distilled off. The isophthalic acid dichloride thus formed is dissolved in 500 ml of dioxane, then a total of 187.2 g of 2,2,6,6-tetramethyl-4-aminopyridine is added dropwise whilst stirring, whereby dioxane (2000 ml in all) is constantly added to allow the reaction mixture, whose temperature should never exceed $_{30}$° C., to remain stirrable. The reaction mixture is subsequently boiled for 48 hours with reflux cooling, the residue is filtered, washed with acetone, dissolved in ca. 1000 ml of water, precipitated again with soda solution (at pH 10 to 11), filtered, the residue washed with water and vacuum-dried (yield >70% of a white powder having a melting point of >300° C.).

According to compound (A) above, R' is preferably selected from the group consisting of —(NH)$R_5$ where $R_5$ is hydrogen or alkyl of 1 to 8 carbons; carboxyl; carboxylic acid derivative; —$(CH_2)_x$(NH)$R_5$, in which x is an integer of from 1 to about 6 and $R_5$ is hydrogen or alkyl of 1 to 8 carbons; —$(CH_2)_y$COOH, in which y is an integer of from 1 to about 6; and —$(CH2)_y$COOH acid derivative in which y is an integer of from 1 to about 6. Most preferably R' is —$NH_2$, —COOH, or —COOH acid derivative. A preferred —COOH derivative is isophthalic acid and terephthalic acid.

Specific examples of compound (A) above are
3 amino-2,2',6,6'-tetramethylpiperidine:
4 amino-2,2',6,6'-tetramethylpiperidine;
4-(aminoalkyl)-2,2',6,6'-tetramethylpiperidine;
4-(aminoaryl)-2,2',6,6'-tetramethylpiperidine;
3-(aminoalkyl)-2,2',6,6'-tetramethylpiperidine;
3-(aminoaryl)-2,2',6,6'-tetramethylpiperidine;
2,2',6,6'-tetramethyl-4-piperidinealkylcarboxylic acid;
2,2',6,6'-tetramethyl-4-piperidinearylcarboxylic acid;
2,2',6,6'-tetramethyl-3-pipeddinealkylcarboxylic acid; and
2,2',6,6'-tetramethyl-3-piperidinearylcarboxylic acid;

The preparation of reactor-modified polyamides are disclosed in U.S. Pat. Nos. 5,618,909, and 5, 851,238 involve adding the compound A into the polyamide polymerization reactor when momonomers and/or oligomers are undergoing polymerization, whereby the compound A is incorporated as chain end groups.

The preparation of modified synthetic polyamides used in accordance with the invention can be effected in another manner, by introducing compounds (A) andlor (B) with the polyamide prior to or at the time the resin is conveyed into the fiber pultrusion zone reservoir. The time prior to or during conveying typically involves adding the compounds to an extruder which feeds the polyamide to the pultrusion zone.

The pigments advantageously used herein include: quinacridones, perylenes, carbon black, titanium ioxide, pigment, Dioxazine, Isoviolanthrone, benzimaidazolones, triarylcarbonium, Indanthrones, i.e., Pigment Brown 60, metal complexes, i.e., Pigment Orange 68, DPP pigments, i.e., Pigment Red 254, Pigment Red 255, Disazo condensation, i.e., Pigment Red, 214, or 242, and the like, Perinone, i.e., Pigment Red 194, Naphtol Reds, i.e., Pigment Red 211, 212, 261, Anthraquinones, diarylides, quinophthalones, monoazopyrazolone,Ca Heteroxycle, i.e., Pigment Yellow 191, Azoheterbcycles, i.e., Pigment orange 64, Pigment Yellow 192, Pigment Yellow 180, Solvent and Polymer Solvent Dyes, inorganic oxides, zeolites, Pigment Red 144, Pigment Violet 19, Pigment violet 122, thioindixos, i.e., Pigment Red 181, monoazo yellows, disazopyrazolones, beta naphthol pigments, brominates phthalocyanine pigments, i.e: Pigment Green 36, aniline blacks, copper phthalocyanine blue and green pigments.

Specific examples of solvent or polymer soluble dyes include colorants that are advantageously employed in the present invention and the coloration effects especially improved in the practice of the invention. These are sensitive to high temperature and based on azo compounds, anthraquinone, xanthene, e.g. Rhodamine B, azine compounds, e.g. nigrosine, perinone and quinoline and pigments based on mono- and disazo compounds, quinacridone, dioxazine, anthraquinone, perylene, thioindigo and chloroisoindoline.

Specific examples of acid dispersed dyes, azo and diazo dyes, phthalocyanine blues and greens, diarylide yellows, perylenes, quinacridone, and the like are:
C.I. Pigment yellow 147, Const. Nr.: 60645, anthraquinone
C.I. Pigment Red 242, Const. Nr.: 20067, disazo-condensation product
C.I. Solvent yellow 163, Const. Nr.: 58840, anthraquinone
C.I. Pigment Red 149, Const. Nr.: 71137, perylene
C.I. Pigment Red 178, Const. Nr.: 71155, perylene
C.I. Pigment Red 209, Const. Nr.: 73905, quinacridone For a comprehensive description of organic pigments and dyes and their application in polymer compositions the reader is referred to e.g. the Encyclopedia of Polymer Science and Technology, (1985), Vol. 3. pp. 746–758 and literature references mentioned therein.

As stated above, preferred pigments for use herein include azo, anthraquinone, quinaccridone, isoindolinone, dioxine or perytene pigment and mixtures thereof. Examples of suitable pigments are Pigment Red 57, Pigment Red 177, Pigment Violet 19, Pigment Yellow 110 and Pigment Violet 23. The phthalocyanine pigments are also preferred for use herein. The phthalocyanine pigments may optionally be susbstituted such with halogens or metals, for example chlorinated, metal-containing phthalocyanine pigment. Highly preferred for use herein are unsubstituted copper phthalocyanine pigments, e.g. mono propylamido copper phthalocyanine, octadecylamido copper phthalocyanine, and mono propylamido copper phthalocyanine. Other examples of copper phthalocyanine pigments are disclosed in U.S. Pat. No. 6,123,761 incorporated herein by reference.

Special effect pigments may be used. These incluse plate-like interference colorants,such as those from Mearl Corp. Other non-platelet, particle scattering colorants are also used which are either absorbing particle scattering colorants or non-absorbing particle scattering colorants depending on whether or not the particle scattering colorants significantly absorb light in the visible region of the spectrum.

Electronic transition colorants can be used in conjunction with particle scattering colorants. Dyes and pigments can also be used in conjunction with particle scattering colorants.

Specific examples include ferroelectric ceramics, e.g., barium titanate and solid solutions of $BaTiO_3$ with either $SrTiO_3$, $PbTiO_3$, $BaSnO_3$, $CaTiO_3$, or $BaZrO_3$); low index scattering particles, e.g., low refractive index materials, such as fluorinated linear polymers, fluorinated carbon tubules, fluorinated graphite, and fluorinated fullerene phases; low refractive index particles such as cavities filled with air or other gases, and low refractive index inorganic materials such as either crystalline or amorphous $MgF^2$. Various inorganic glasses, such as silicate glasses, are preferred for use as particle scattering. Relaxor ferroelectrics that have the lead titanate type of structure ($PbTiO_3$) and disorder on either the Pb-type of sites (called A sites) or the Ti-type of sites (called B sites). Examples of such relaxor ferroelectrics having B site compositional disorder are $Pb(Mg_{1/3}Nb_{2/3})O_3$ (called PMN), $Pb(Zn_{1/3}Nb_{213})O_3$ (called PZN), $Pb(Ni_{1/3}Nb_{2/3})O_3$ (called PNN), $Pb(Sc_{1/2}Ta_{1/2})O_3$, $Pb(Sc_{1/2}Nb_{1/2})O_3$ (called PSN), $Pb(Fe_{1/2}Nb_{1/2})O_3$ (called PFN), and $Pb(Fe_{1/2}Ta_{1/2})O_3$. These are of the form $A(BF_{1/3}BG_{2/3})O_3$ and $A(BF_{1/2}BG_{1/2})O_3$, where BF and BG represent the atom types on the B sites. Further examples of relaxor ferroelectrics with B-site disorder are solid solutions of the above compositions, such as $(1-x)Pb(Mg_{1/3}Nb_{2/3})O_3-xPbTiO_3$ and $(1-x)Pb(Zn_{1/3}Nb_{213})O_3-xPbTiO_3$. Another more complicated relaxor ferroelectric that is preferred for the present invention is $Pb_{1-x}^{2+}La_x^{3+}(Zr_y Ti_z)_{1-x/4} O_3$, which is called PLZT.

PZT (lead zirconate titanate, $PbZr_{1-x} Ti_x O_3$) is an especially preferred ferroelectric ceramic for use as a particle scattering colorants.

The absorbing particle scattering colorants are colloidal-sized particles of metals such as gold, silver, platinum, palladium, lead, copper, tin, zinc, nickel, aluminum, iron, rhodium, osmium, iridium, and alloys, metal oxides such as copper oxide, and metal salts. Preferably the particles are less than about 0.5 micron in average dimension. More preferably the particles are less than about 0.1 microns in average dimension.

For other special effect pigments, see Burnam, K. J., et al. "Nanocomposites Containing Nonoclusters of Ag, Cu, Pt, Os, Co3C, Fe2P, Ge, or Pt/Sn"; Nanostructured Materials, vol. 5, No. 2, pp. 155–169, 1995; Gan, L. M. et al.; "Preparation of Conducting-Coated Barium Sulfate Namo-particles in Inverse Micro Polyaniline-emulsions", Materials Chemistry and Physics, 40(1995) pp. 94–98, and Dirix, Y., et al., "Optical Properties of Oriented Polymer/Dye Polarizers", Macromolecules, 1995, 28, pp. 486–491.

A colorant of 1 part of Graphtol Echtgelb 3 GP [=C.I. Pigment Yellow 155], an azopigment from Clariant, in a blend with 2 parts of titanium dioxide (rutile pigment) [=C.I. Pigment White 6].

Color concentrates are well established and useful in the present invention. Color concentrates with high levels of colorants or pigments are desirable. However, high levels of colorants may lead to brittle concentrates that produce unwanted dust upon preparation and handling. In the respect highly loaded commercial color concentrates use a low viscosity wax, such as a castor wax, bis-stearamides, or pentaerythritol esters. Although the incidence of extruder screw slippage should be avoided.

Conventional approaches for providing matrices for color concentrates include the following patents. U.S. Pat. No. 3,591,409, provides coated resin granules by high intensity mechanical blending subjecting a mixture of the discrete thermoplastic resin particles, a hydrocarbon wax and a particulate solid material to high intensity blending at elevated temperatures. U.S. Pat. No. 5,157,067 provides liquid colorant/additive concentrates for incorporation into plastics. The liquid concentrate comprises (I) a vehicle comprising (a) at least one organic rosin material, and (b) at least one surfactant; and (ii) at least one colorant or additive. U.S. Pat. No. 5,670,561 discloses color concentrates comprising a polymer of vinyl aromatic monomer having an M n of from about 500 to about 4000, a wax and a mixture of two or more thereof, (b) at least one resin selected from the group consisting of a copolymer of an olefin and an acrylate or a methacrylate, a polymer of a vinyl aromatic monomer having an M n of at least about 10,000 and a mixture thereof, and (c) at least one colorant.

Colorant Examples

A colorant is obtainable as a masterbatch (MB) from Clariant under the designation Sanylen Blau 39–93 [C.I. Pigment Blue 29]. It is a polysulphide-containing sodium-aluminium silicate.

A colorant is obtainable as a masterbatch (MB) from Clariant under the designation Sanylen Grau AU 604/S5 and consists of: 71.7% Sanylen Blau 39-93 [C.I. Pigment Blue 29] as MB60 in LDPE, 14.2% Sanylen Schwarz EMA (carbon black) [C.I. Pigment Black 7] as MB30 in LDPE.

10.2% Sanylen Weiss 39-93 (rutile) [C:I. Pigment White 6] as MB60 in LDPE 3.8% Sanylen Braun 3RLM (Fe$_2$O$_3$) [C.I. Pigment Red 101] as MB50 in LDPE.

Other Addtives/Adjuvants

Conventional additives may optionally be present in the polyamide which is modified according to the invention, for example, primary thermal stabilizers, co-stabilizers being antioxidants, both primary and secondary, light stabilizers, lubricants, pigments, reinforcing and or non-reinforcing fillers, waxes, e.g. Isocetyl stearate, metallic stearates, e.g. Calcium, Zinc, Sodium, Magnesium, Aluminum stearates, montanic acid waxes i.e., Montan Wax E®, Wax S®, Wax OP® available from Clariant Corporation, bis-stearamide waxes i.e., Acrawax® C, and montan wax, and the like.

Conventional primary antioxidants are suggested for inclusion herein at conventional usage amounts. Antioxidants include, for example alkylated monophenols, alkylated hydroquinones, alkylidenebisphenols, hindered alkyl benzyl compounds, acylaminophenols, esters of beta.-(3,5-di-tert-butyl-4-hydroxyphenyl)propionic acid, and the like which are disclosed in U.S. Pat. No. 5,051,459 incorporated herein by reference. A commercially available antioxidant is IRGANOX®. 1098 from Ciba Specialty Chemicals.

Also mentioned as adjuvants optionally employed are the conventional acid acceptors, mold release agents, and lubricants which are commercially practiced with polyamide.

An effective amount of compounds (A) and/or (B) when introduced into an extruder containing polyamide polymer ranges from 0.05% to 5% by weight based on the weight of matrix polynier. More preferably the usage level is from 0.5 to 1.5% by weight.

In accordance with a specific aspect of the invention a process for making a long fiber reinforced polyamide "let-down" composite having from 5 wt. % to 60 wt. % of reinforcing fibers, where the fibers are well dispersed and partially oriented, the process comprises (1) mixing a polyamide compound which is pigmented in a heated extrusion mixing zone, said zone conveying a composited melt into a shaping zone, said mixing under heat and rotational shear, and (2) dispersing long fiber-reinforced pellets into the pigmented polyamide compound, the fiber-reinforced pellets comprising the polyamide modified as described above, and long fibers wherein the reinforcing fibers have a length equal to, the fiber-reinforced pellet length.

The pellet matrix polyamide is modified according to methods above described wherein either by forming a polyamide polymer by introducing an effective amount of compound (A) and/or (B) with a polyamide precursor, and reacting said functional group with the end group of said polyamide precursor at a temperature sufficient for polymerization to occur, to thereby bind the compound or reactive moiety thereof to the polyamide;

or by the method of making a combination of (A) and/or (B) with polyamide in an extruder in which the melt mixed and is either fed directly into a pultrusion impregnation chamber or later used, and ultimately the modified polyamide comes into intimate contact with a continuous fiber roving in the pultrusion process. The most preferred aspect provides that polyamide in the pultrusion matrix is modified according to the above, and the polyamide polymer further used in the let-down has been also so modified before or during the let-down mixing with the pellets.

EXAMPLES

Long fiber glass reinforced composite pellets were prepared in a conventional pultrusion process using nylon 6 as the polymer matrix.

The matrix was pigmented with a perylene red pigment. The following formulation was used:

a) Nylon 6 chip
b) 5% Zinc Sulfide
c) 1% Pigment Red 178 (Perylene pigment from BASF)

For the control, no modifier compound was included. Example 2 contained 1 wt. % on weight of (a–c), of a matrix modifier of the formula commercially available from Clariant.

Injection molded plaques containing a final weight percent of glass fiber of 30% were made and physical properties were measured as followed:

| Properties | ASTM method | Units | Control 1 | Example 2 |
|---|---|---|---|---|
| Tensile Strength | D 638 | p.s.i. | 15,000 | 18,450 |
| Elongation | D 638 | (%) | 2.2 | 3.1 |
| Flexural Strength | D 790 | p.s.i. | 25,300 | 30,313 |
| Flex Modulus | S 790 | p.s.i. | 1,000,000 | 1,275,000 |
| Notched Izod 1/8 in. | D 256 | Ft-lb./inch | 1.10 | 2.52 |
| Heat Distortion Temperature @ 264 p.s.i. | D 648 | ° C. | 205 | 216 |

Figure 1:
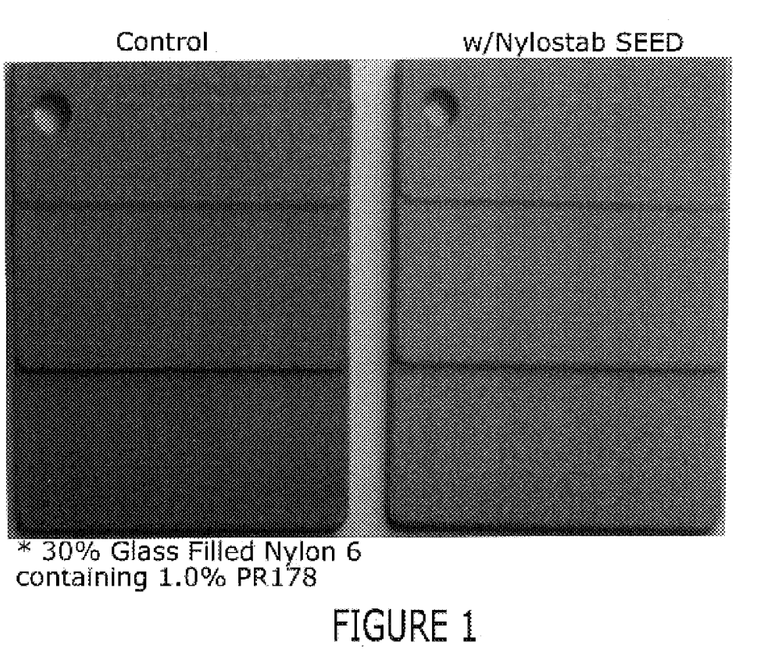
FIG. 1 is a photograph of injection molded test plaques of perylene red pigmented, 30% long glass-filled Nylon 6 representing the control and Example 2.
Figure 2:
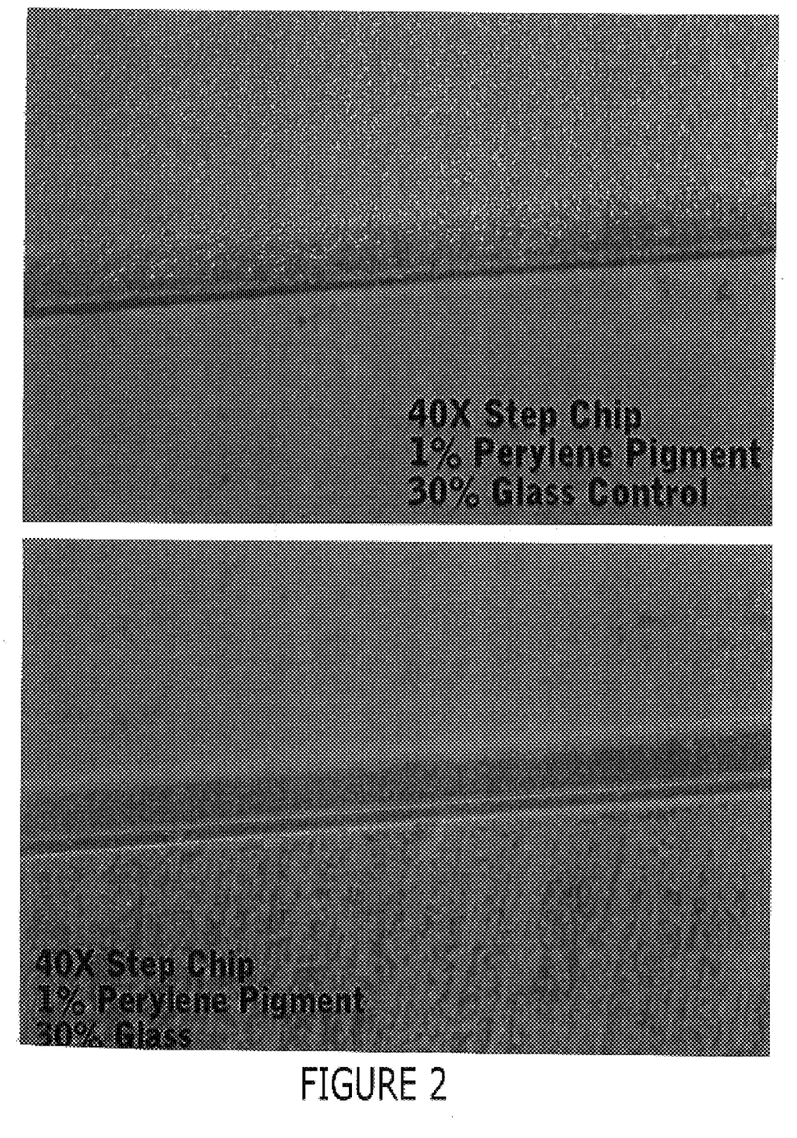
FIG. 2 is a 40× photograph of the step edges of the molded plaques made from the Control and Example 2.
Figure 3:
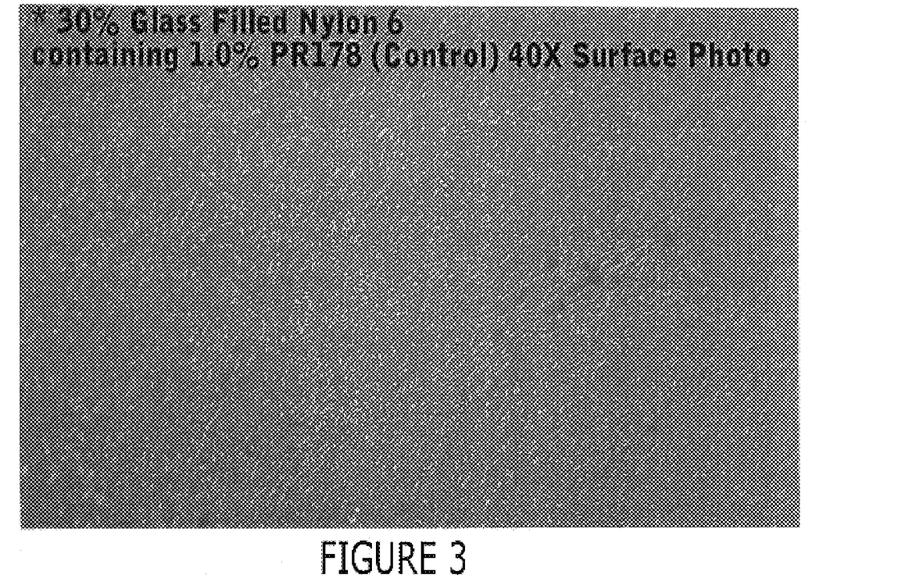
FIG. 3 is a micrograph at 40× of the surface of the plaque made from the Control.
Figure 4:
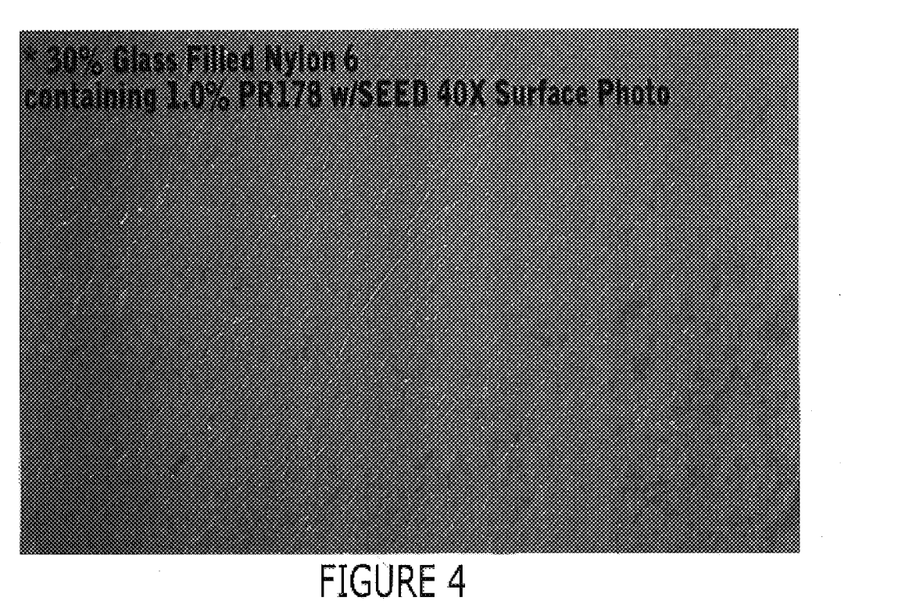
FIG. 4 is a micrograph at 40× of the surface of the plaque made from Example 2.

The significant improvements in physical properties was surprising and unexpected. With reference to FIGS. 1–4, the difference in physical properties can be partly attributable to the higher relative degree of orientation of the fibers in the practice of the invention.

What is claimed is:

1. A process for making a long fiber reinforced polyamide composite comprising a homogeneous mixture of polyamide resin and long fiber pellets, wherein the pellets comprise from 5 wt. % to about 60 wt. % reinforcing fibers and polyamide, the process comprises
- (i) incorporating a polyamide compound and at least one pigment, in a heated extrusion mixing zone, said zone conveying a composited melt into a shaping zone, said mixing under heat and rotational shear, together with
- (ii) pellets of a composite of long fiber-reinforced polyamide, the long fiber-reinforced polyamide pellets prior to combining therewith comprise fibers equal to the pellet length, and polyamide and a compound of the formula A and/or B, (A)

where A' in (A) comprises a functional group which is an amine, a hydrolyzable group which forms an amine, an amide-forming group; $R^*$ is methyl or other lower ($C_2$–$C_4$ alkyl); and R" is selected from the group consisting of hydrogen; alkyl of 1 to 3 carbons; and —$OR_4$ in which $R_4$ is selected from the group consisting of hydrogen, methyl, and alkyl containing 1 to 7 carbons; and (B)

(B)

n = 2, 3 or 4 including dimers and trimers, in which at least one of $R_{40}$ is —OH, —OR, and at least one of $R_{40}$ is $R_a$, $R_b$, or $R_c$.

wherein $R^*$ and R' have the same meaning as A' above.

2. The process of claim 1 wherein the amount of A and/or B is incorporated into the polyamide during polymerization to achieve about 0.1 to about 1 weight percent based on the weight of the polyamide.

3. The process of claim 1 wherein the composition in (i) further comprises A and/or B.

* * * * *